(12) United States Patent
Campbell et al.

(10) Patent No.: US 7,720,956 B2
(45) Date of Patent: May 18, 2010

(54) METHOD, SYSTEM, AND STORAGE MEDIUM FOR PROVIDING CONTINUOUS COMMUNICATION BETWEEN PROCESS EQUIPMENT AND AN AUTOMATED MATERIAL HANDLING SYSTEM

(75) Inventors: Philip L. Campbell, Millbrook, NY (US); Paul D. Hand, Stanfordville, NY (US); Edward Sherwood, Wingdale, NY (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 12/167,275

(22) Filed: Jul. 3, 2008

(65) Prior Publication Data

US 2008/0259953 A1 Oct. 23, 2008

Related U.S. Application Data

(63) Continuation of application No. 10/709,867, filed on Jun. 2, 2004, now Pat. No. 7,426,555.

(51) Int. Cl.
*G06F 15/173* (2006.01)
(52) U.S. Cl. .................................. 709/223
(58) Field of Classification Search ............. 709/223, 709/224; 370/464, 467; 702/179, 182; 700/108, 700/230
See application file for complete search history.

(56) References Cited

U.S. PATENT DOCUMENTS

| | | | | |
|---|---|---|---|---|
| 5,333,240 A | * | 7/1994 | Matsumoto et al. | 706/20 |
| 6,928,892 B2 | * | 8/2005 | Storbeck et al. | 73/865.8 |
| 6,968,248 B1 | * | 11/2005 | Mata et al. | 700/99 |
| 2004/0111339 A1 | * | 6/2004 | Wehrung et al. | 705/30 |

* cited by examiner

*Primary Examiner*—Frantz B Jean
(74) *Attorney, Agent, or Firm*—Cantor Colburn LLP; Katherine Brown

(57) ABSTRACT

A system and storage medium for providing continuous communication between passive and active equipment are provided. The system includes a conversion unit coupled to at least one the passive and active equipment, which monitors signals received from the equipment. The signals relate to an equipment state. Upon detecting a state change, the system converts a signal associated with the state change to a TCP/IP-formatted request. The system also includes a message handler coupled to the conversion unit, which receives the request from the conversion unit and transmits the request to a host system. The message handler also removes TCP/IP formatting from the request resulting in a file transfer protocol message. The conversion unit converts the file transfer protocol message to a signal and responds to the signal by the equipment. The conversion includes decoding the file transfer protocol message and setting a signal line to a requested state.

10 Claims, 8 Drawing Sheets

METHOD, SYSTEM, AND STORAGE MEDIUM FOR PROVIDING CONTINUOUS COMMUNICATION BETWEEN PROCESS EQUIPMENT AND AN AUTOMATED MATERIAL HANDLING SYSTEM

CROSS-REFERENCE TO RELATED APPLICATIONS

This application is a continuation of U.S. patent application Ser. No. 10/709,867 filed on Jun. 2, 2004, the disclosure of which is incorporated by reference herein in its entirety.

BACKGROUND OF INVENTION

The present invention relates generally to manufacturing production systems, and more particularly, to a method and system for providing continuous communication between process equipment and an automated material handling system (AMHS).

The efficiency of a manufacturing enterprise depends, in part, on the quick flow of information and process execution across a complete supply chain. Advancements in shop-floor activities include the automation of production equipment, material processing, material control systems, and the integration of these systems with a host manufacturing execution system (MES). Automating manufacturing processes for certain industries presents many challenges. Unlike the automotive industry, for example, which employs standard assembly-line processing techniques, the manufacture of semiconductor materials such as wafers in an electronics industry generally involves non-linear processing techniques and frequent changes to production tools that are introduced to the AMHS.

Moreover, due to the migration of larger and heavier wafers (e.g., 300 mm), manufacturers are relying more heavily on AMHSs to handle the processing and inter-bay transport of these items. Recent advancements in AMHS technology include the standardization of control signals that are transferred between production equipment and the AMHS, as well as the associated cabling requirements. This standardization ensures reliability in loading and unloading wafer materials at the production equipment load ports and is defined by Semiconductor Equipment and Materials International® (SEMI), headquartered in San Jose, Calif., in publication "SEMI E15.1-1108 Specification for 300 mm Tool Load Port" and is also referred to as SEMI E84 standard.

During the installation of these cables, automated manufacturing operations are halted to ensure the installer's safety while making the physical connections. Clearly, this slows down the production schedule and has a negative impact on overall productivity.

What is needed, therefore, is a way to perform these installations without taking the production equipment offline.

SUMMARY OF INVENTION

The above-stated shortcomings are overcome or alleviated by a system and storage medium for providing continuous communication between passive equipment (e.g., process equipment) and active equipment (e.g., automated material handling system equipment).

The system includes a conversion unit coupled to at least one the passive and active equipment, which monitors signals received from the equipment. The signals relate to an equipment state. Upon detecting a state change, the system converts a signal associated with the state change to a TCP/IP-formatted request. The system also includes a message handler coupled to the conversion unit, which receives the request from the conversion unit and transmits the request to a host system. The message handler also removes TCP/IP formatting from the request resulting in a file transfer protocol message. The conversion unit converts the file transfer protocol message to a signal and responds to the signal by the equipment. The conversion includes decoding the file transfer protocol message and setting a signal line to a requested state.

A storage medium encoded with machine-readable computer program code for providing continuous communication between passive equipment and active equipment is also provided in an exemplary embodiment.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

DETAILED DESCRIPTION

The conversion system enables continuous communications between processing equipment and an automated material handling system. The conversion system is coupled to the process equipment and AMHS connectors and includes both a conversion unit that converts the parallel interface signals into an Ethernet LAN packaged communication as well as a message handler that interfaces between the AMHS/process equipment and the conversion units. By converting the parallel interface signals to a network-based communication, individual cables for each equipment load port are not required. Each piece of process equipment may then act as its own network hub, distributing signals to individual load ports as necessary.

Figure 1:
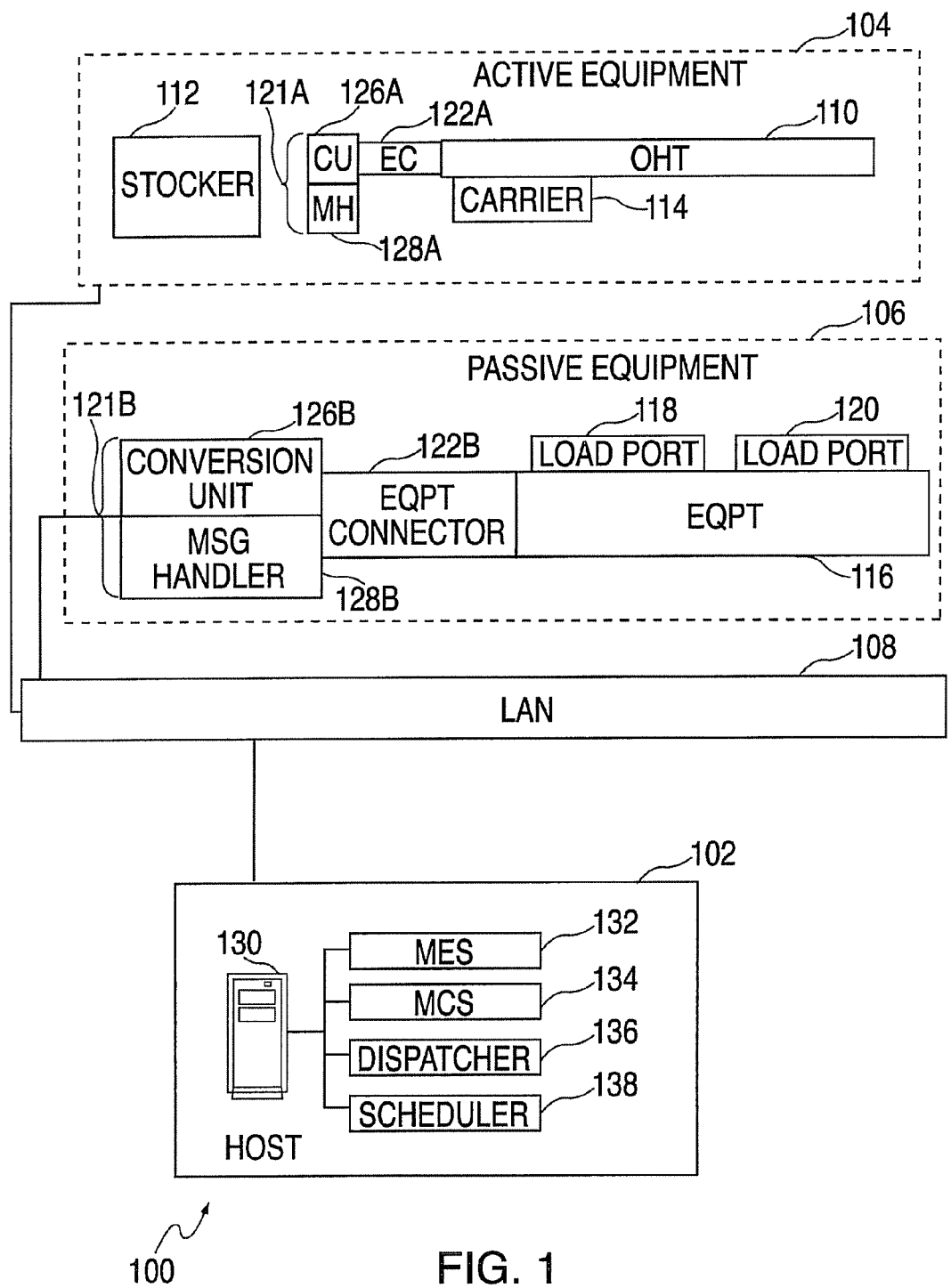
FIG. 1 is a block diagram of a portion of a manufacturing system within which the conversion system may be implemented in exemplary embodiments.

Referring now to FIG. 1, a portion of a manufacturing system 100 upon which the conversion system may be implemented is shown. Manufacturing system 100 includes a host system 102 in communication with an AMHS 104 and process equipment 106 via a network 108. For purposes of illustration, manufacturing system 100 is a semiconductor fabrication plant in which 300 mm wafers are processed.

AMHS 104 includes an overhead transport (OHT) device 110 and a carrier 114. These are also referred to herein as 'active' equipment. It will be understood that other automated equipment may be utilized in addition to, or in lieu of, OHT device 110 such as, for example, automated guided vehicles (AGVs), monorails, track vehicles, robotic devices, and other similar vehicles used to move materials. Carrier 114 comprises a device used for holding substrates pending processing, such as wafers, dies, and integrated circuits. Also included in AMHS 104 is a stocker 112. Stocker 112 represents a unit for storing materials that are awaiting processing or are awaiting transport to another location. Stocker 112 receives materials from carrier 114.

Figure 2:
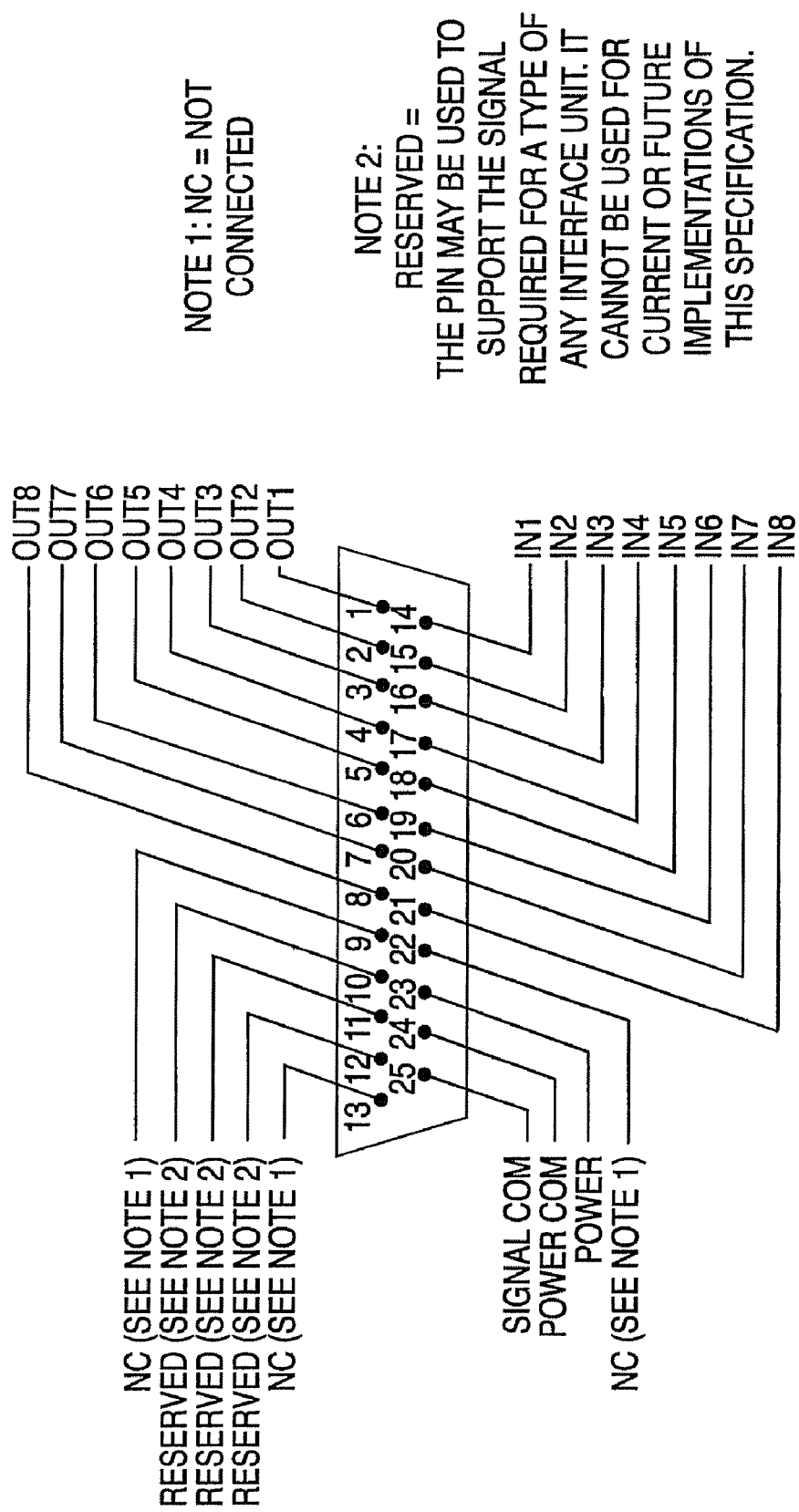
FIG. 2 is a diagram illustrating the physical pinouts used for a DB25 equipment connector.
Figure 3:
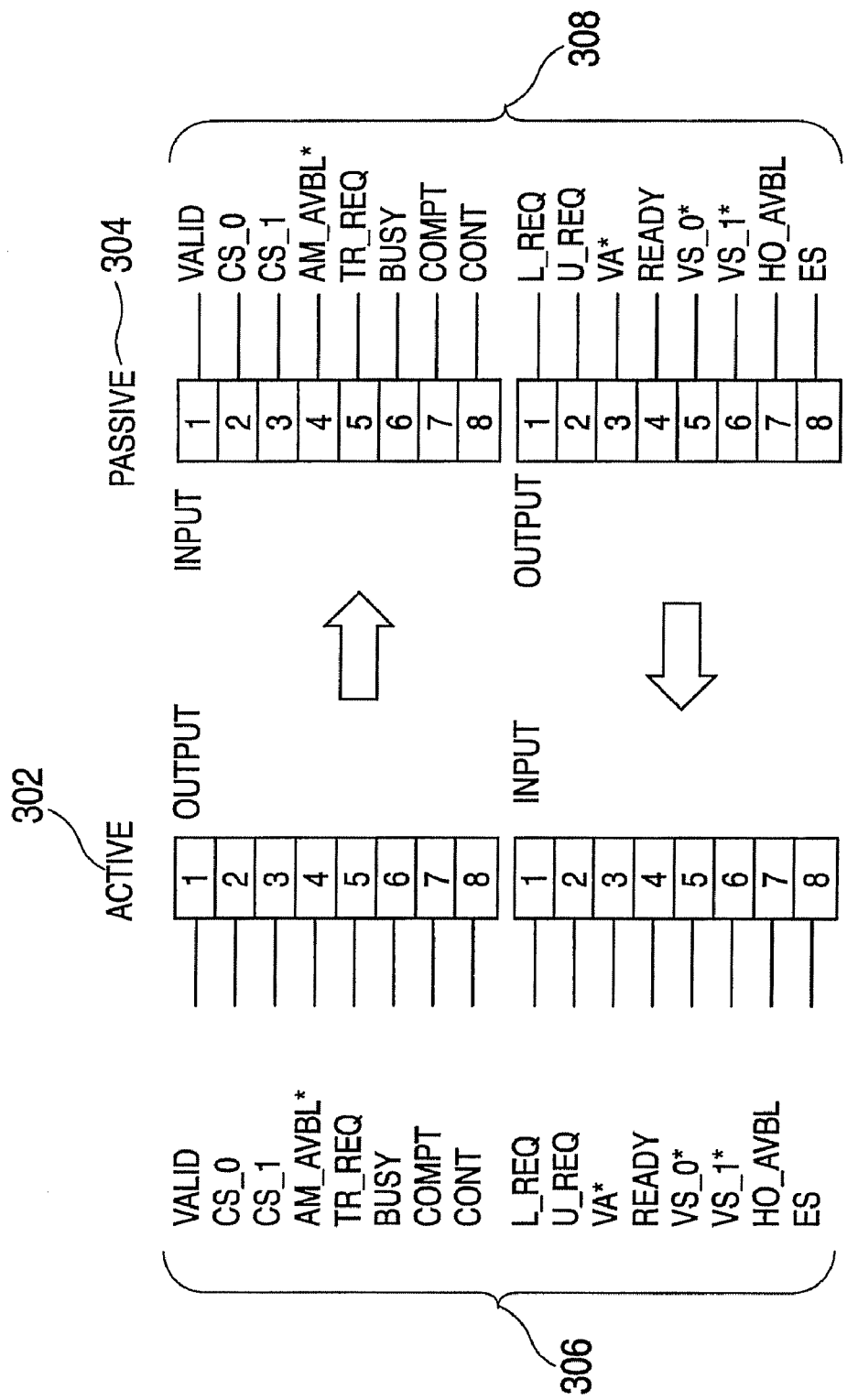
FIG. 3 is a diagram illustrating the signal interface between active and passive components of a manufacturing system during an E84 handshake.
Figure 4:
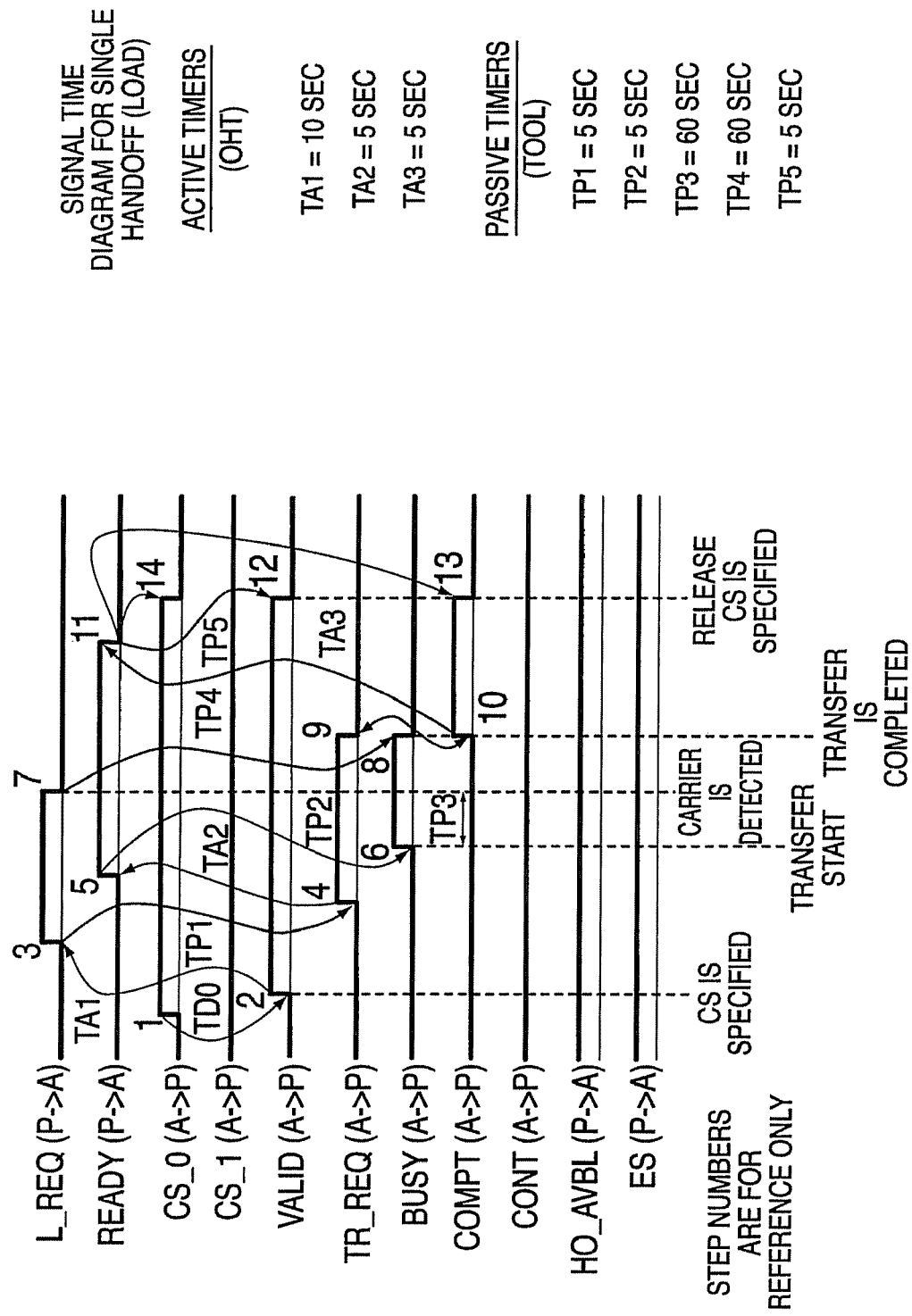
FIG. 4 is a diagram illustrating the state changes and interaction of handshake signals conforming to the SEMI® E84 specification.

AMHS 104 also includes an equipment connector 122A. Equipment connector 122A provides a parallel port interface between AMHS 104 and process equipment 106. Equipment connector 122A is preferably a DB2 RS232 connector that includes 25 pins. The SEMI® E84 specification defines different pin assignments for connectors 122A-B depending upon the active equipment-side connection and the passive equipment-side connection. For example, active equipment 104 supplies power using connector 122A pins 22 and 24. Passive equipment 106 supplies power using connector 122B pins 23 and 25. Pin assignments for connector 122B of passive equipment 106 are illustrated further in FIG. 2. Each pin assignment shown in FIG. 2 places input/output, reserved, and no-connect pins on the first 21 pins. Power assignments are placed on pins 23-25. In a typical handshake operation, signals are exchanged between process equipment load ports 118, 120 and AMHS 104. These control signals relate to state changes which indicate initiation and execution of a handoff. A signal interface between active and passive components during the handshake are shown in FIG. 3. FIG. 3 illustrates active equipment component 302 along with its input/output signals 306. Also shown in FIG. 3 is passive equipment component 304 along with its input/output signals 308. The flow of signal exchanges is shown by the arrows between active equipment component 302 and passive equipment component 304. This signal interface is also defined by SEMI® E84 specification. Timing requirements are also defined by SEMI® E84 specification. Timers provide timing of critical sections of load/unload sequences as shown generally in FIG. 4. FIG. 4 illustrates a signal time diagram for a single handoff operation (e.g., load signal).

Also included in AMHS 104 is conversion system 121A, which comprises a conversion unit 126A and a message handler 128A. The connection of conversion unit 121A to equipment connector 122A enables signal exchanges to occur between AMHS 104 and process equipment 106 during the installation or repair of cabling between AMHS 104 and process equipment 106, as well as during the installation of cabling between load ports 118 and 120. Conversion unit 126A comprises an EPROM or similar programmable material that includes computer instructions for receiving and processing signals from process equipment 106. Signals received from AMHS 104 are converted to a TCP/IP-formatted message. Message handler 128A comprises a program or routine that processes information received from conversion unit 121A as well as from host system 102. Message handler 128A directs messages received from conversion unit 121A to host system 102 and transmits messages received from host system 102 to conversion unit 121A.

Process equipment 106 includes a processing machine 116, which comprises a fabrication device used to process materials. Process equipment 106 includes two load ports 118 and 120 which enable the loading and unloading of production materials to and from carrier 114. For example, in a semi-conductor manufacturing environment, load ports 118 and 120 may be used to receive wafer carriers, frame carriers, and other similar items. Load ports 118 and 120 are preferably SEMI-compliant (i.e., conform to standards set forth by Semiconductor Equipment and Materials International (SEMI), an organization with established goals to further industry improvement by bringing industry persons together to solve common technical issues). Thus, the initiation and execution of the loading and unloading processes are referred to herein as an E84 handoff or handshake. Process equipment 106 is also referred to herein as 'passive' equipment.

Process equipment 106 also includes an equipment connector 122B. Equipment connector 122B provides a parallel port interface between AMHS 104 and process equipment 106. Equipment connector 122B is preferably a DB2 RS232 connector that includes 25 pins. Also included in process equipment 106 is conversion system 121B, which comprises a conversion unit 126B and a message handler 128B. The connection of conversion unit 121B to equipment connector 122B enables signal exchanges to occur between AMHS 104 and process equipment 106 during the installation or repair of cabling between AMHS 104 and process equipment 106, as well as during the installation of cabling between load ports 118 and 120. Conversion unit 126B comprises an EPROM or similar programmable material that includes computer instructions for receiving and processing signals from process equipment 106. Signals received from process equipment 106 are converted to a TCP/IP-formatted message. Message handler 128B comprises a program or routine that processes information received from conversion unit 121B as well as from host system 102. Message handler 128B directs messages received from conversion unit 121B to host system 102 and transmits messages received from host system 102 to conversion unit 121B.

Host system 102 includes a server 130 that executes various manufacturing-related applications such as a manufacturing execution system application 132, a materials control system application 134, a dispatcher 136, and a scheduling application 138. Manufacturing execution system 132 manages the operations conducted within system 100. Materials control system application 134 is responsible for coordinating the efforts of the AMHS 104 to move materials to the appropriate location such as process equipment 106. Materials control system application 134 may also function as an interface between MES application 132 and AMHS 104, as well as for dispatcher 136 and scheduling application 138. Materials control system application 134 receives messages from message handlers 128A-B and returns information to message handlers 128A-B, both via a network 108, as described further herein.

Host system 102 is in communication with AMHS 104 and process equipment 106 via network 108. Network 108 may comprise any type of communications network such as an intranet, extranet, or Internet network. Network 108 may comprise utilize wireline and/or wireless technologies. In preferred embodiments, network 108 is an Ethernet local area network (LAN). Utilizing existing standards such as 802.11 (Wi-Fi) in accordance with the Institute of Electrical and Electronics Engineers (IEEE) standards for wireless LANs, or other suitable standard such as Bluetooth, network 108 may comprise a wireless LAN.

Figure 5:
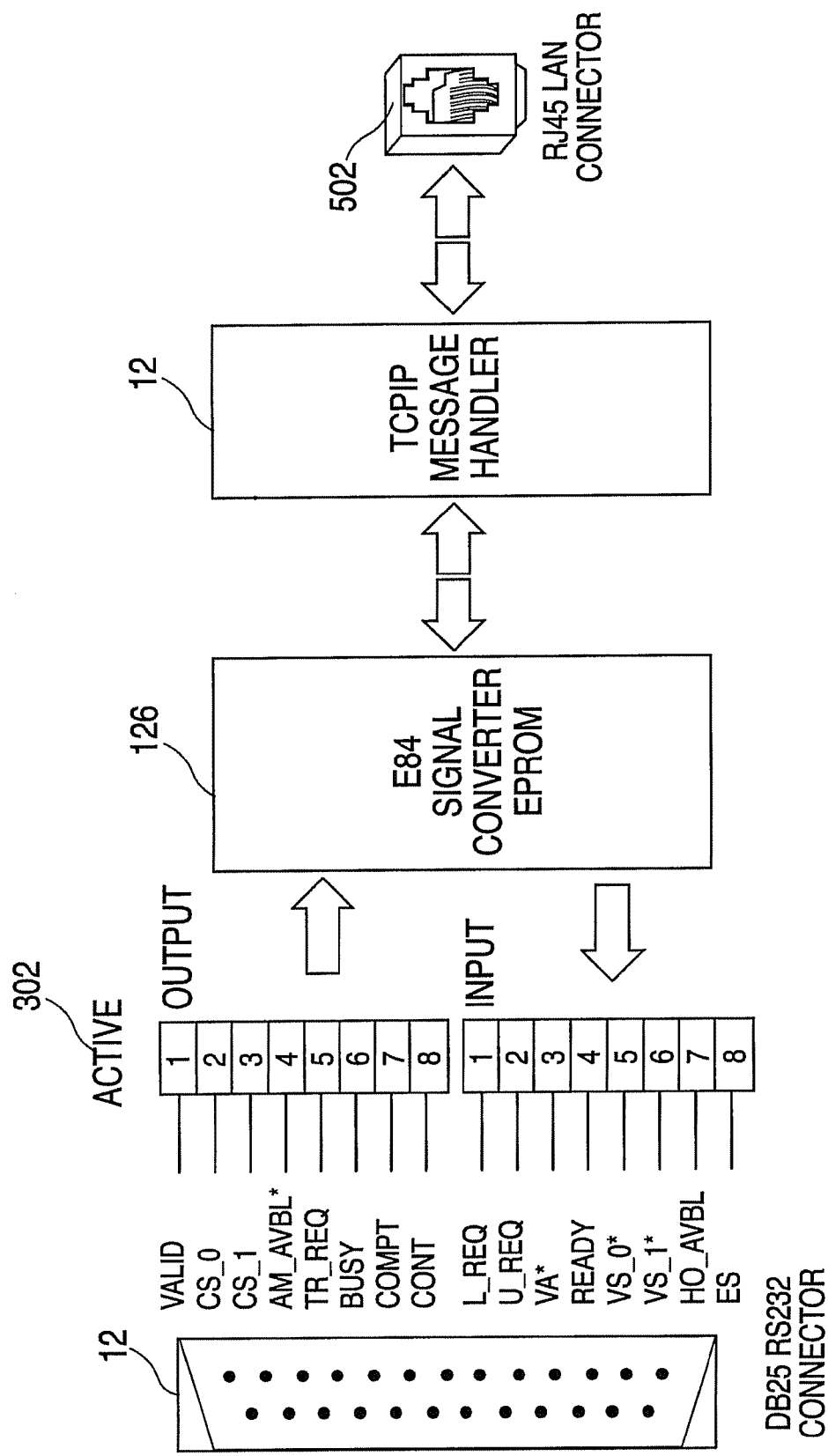
FIG. 5 is a block diagram illustrating in further detail the components of the conversion system and their equipment interfaces in exemplary embodiments.

Referring now to FIG. 5, a block diagram of the conversion system 121 components and its interfacing elements. FIG. 5 illustrates an active side equipment connector 122A and interface signals 302. Conversion unit 126A receives signals from connector 122A and converts the signals to a TCP/IP-formatted message as described further in FIG. 6. Conversion unit 126A further receives messages from message handler 128A and converts them to signals that are readable by active equipment 104. Message handler 128A receives formatted messages from conversion unit 126A and delivers them to host system network 108 via, for example, an RJ45 LAN connector 502. Message handler 128A also receives response messages from host system 102 via network 108 and delivers the messages to conversion unit 126A. Response messages are derived in a manner similar to that described above in FIG. 5, however, the response messages originate from passive equipment 106 in response to signals produced by active equipment 104.

Figure 6A:
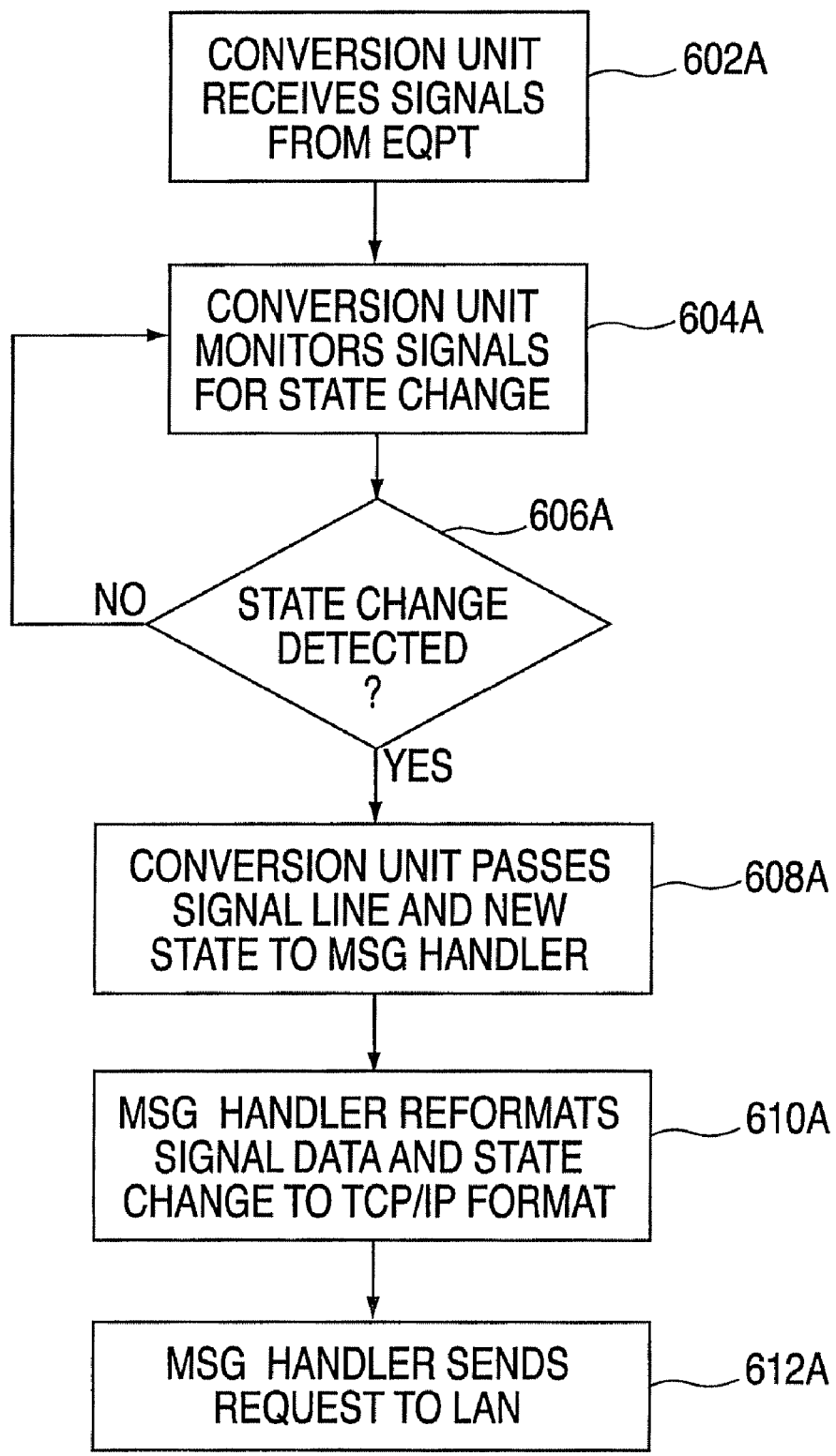
FIG. 6A is a flowchart describing a process for converting a signal received from process equipment to a TCP/IP-formatted message in exemplary embodiments.
Figure 6B:
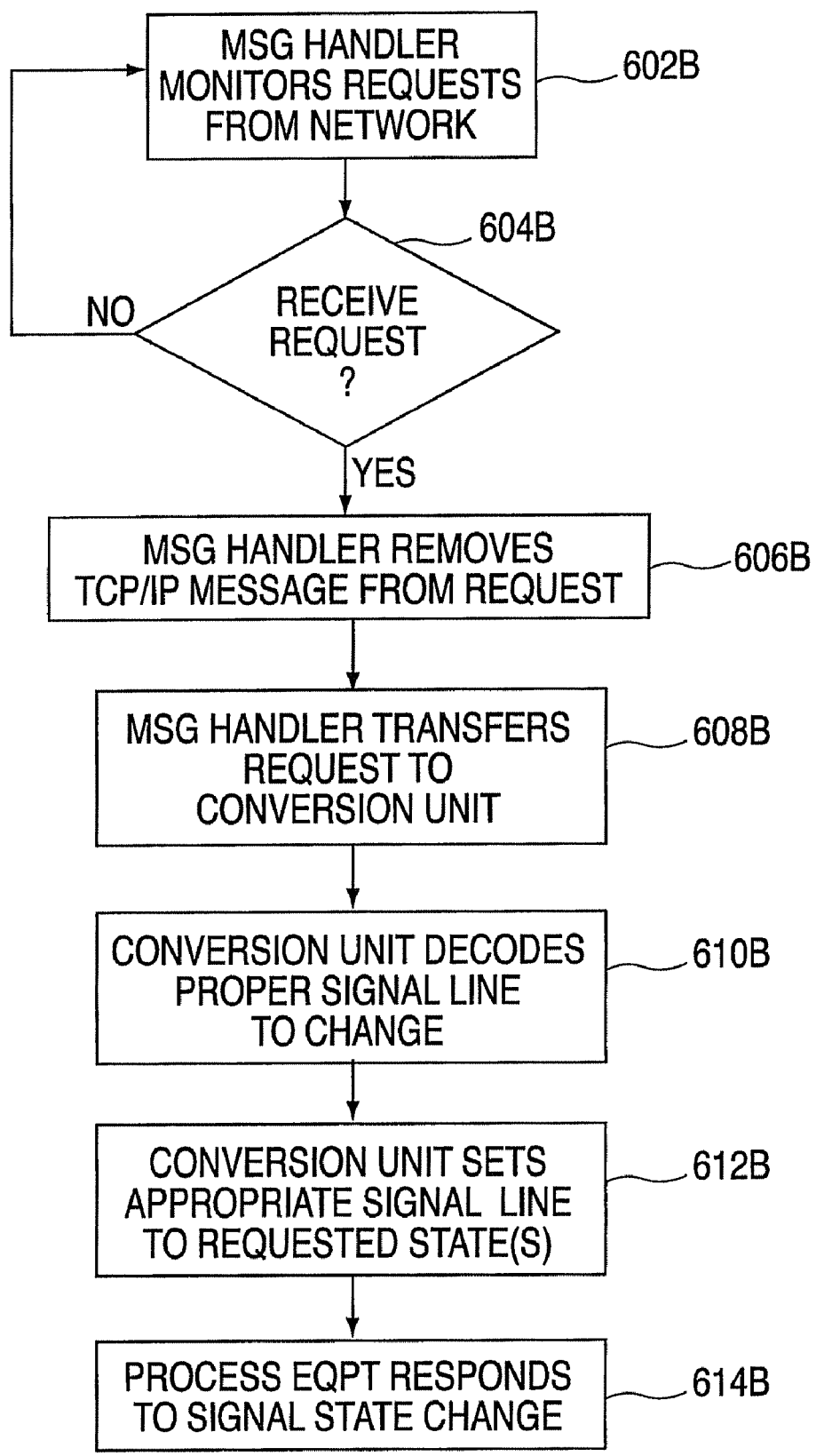
FIG. 6B is a flowchart describing a process for converting a TCP/IP-formatted message received from a host system to a signal readable by process equipment in exemplary embodiments.

Referring now to FIGS. 6A and 6B, a process for implementing the conversion system 121 will now be described. FIG. 6A describes the conversion process from process equipment 106 to host system 102. FIG. 6B describes the conversion process from host system 102 to process equipment 106. It will be understood that the process steps described in FIGS. 6A-6B may be performed for active equipment-initiated signals as well as passive equipment-initiated signals.

At step 602A, conversion unit 126B receives signals from process equipment 106 via equipment connector 122B. Conversion unit 126B monitors these signals, looking for any state changes that occur at process equipment 106 at step 604A. State changes refer to changes resulting from transactions occurring between AMHS 104 and process equipment 106. These state changes are indicated via pin assignments for connectors 122A-B as described above. For example, during a load cycle, several signals may be changing states simultaneously. In one case, a carrier 114 is detected on a load port 118. In response, AMHS 104 turns the TR_REQ and BUSY signals to OFF and the COMPT signal to ON. Process equipment 106 then responds to these signal changes by turning its READY signal OFF.

Figure 7:
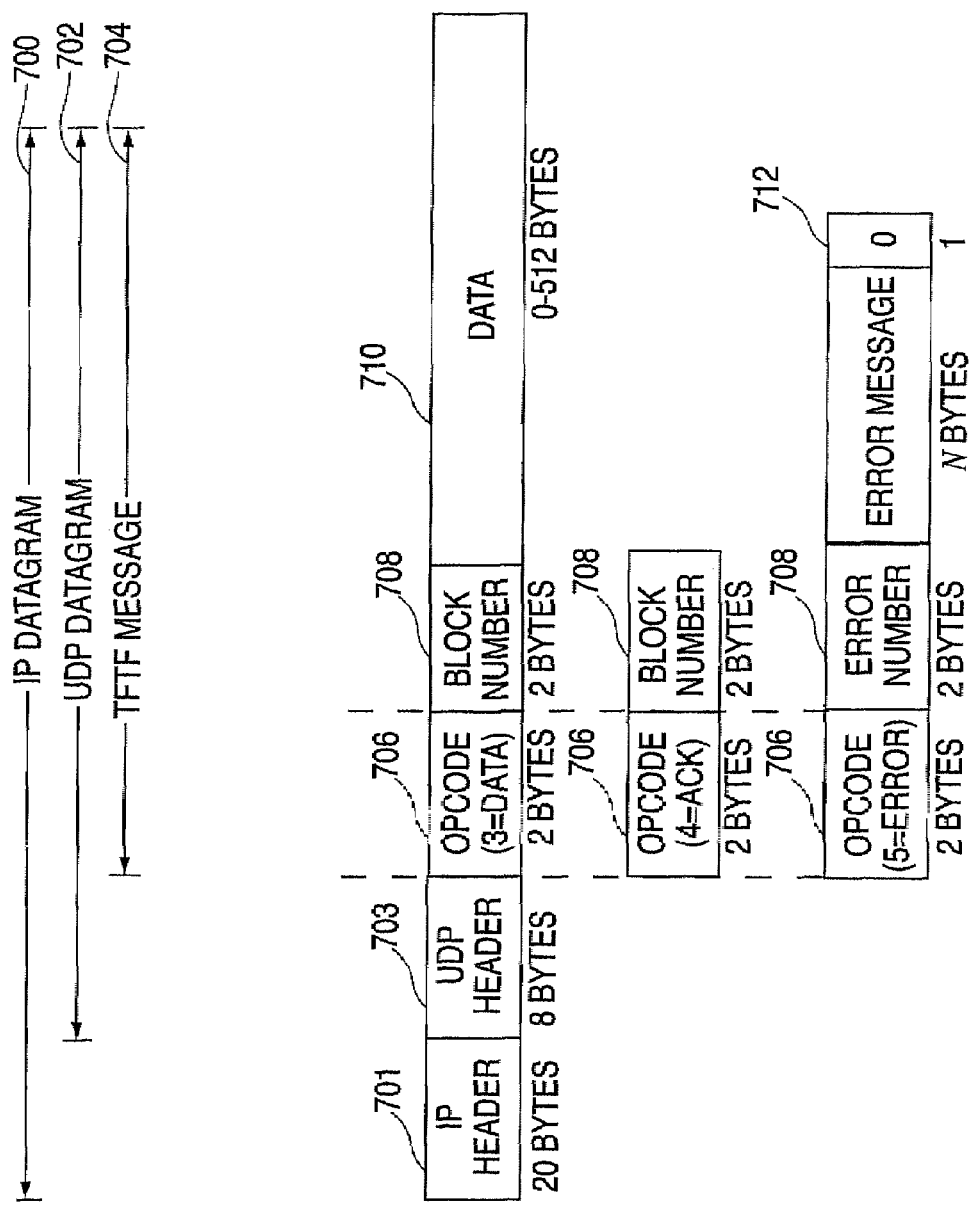
FIG. 7 is a sample TCP/IP message format used by the conversion system in exemplary embodiments.

If a state change has been detected at step 606A, conversion unit 126B passes the signal line and new state to message handler 128B at step 608A. If no state change is detected at step 606A, conversion unit 126B continues to monitor signals received from process equipment 106. Referring back to step 608A, message handler 128B reformats the signal data and new state into a TCP/IP message request at step 610A. A sample TCP/IP data format is shown in FIG. 7. FIG. 7 illustrates an Internet Protocol (IP) packet 700 broken down into various components. For example, IP packet 700 includes a user datagram protocol (UDP) packet 702, which in turn comprises a message 704 using Trivial File Transfer Protocol (TFTP) or other form of file transfer protocol. IP packet 700 includes an IP header 701 and a UDP header 703. IP header 701 contains the address of the message target, such as one of load ports 118-120. TFTP message 704 comprises an opcode 706, a block number or error 708, and a data message 710. Data message 710 contains the E84 signal name and corresponding signal state. In appropriate circumstances, block 712 contains an error message.

At step 612A, the message request (i.e., IP packet 700) is sent by message handler 128B to network 108. The message 700 is then transmitted via network 108 to host system 102 for processing. If AMHS 104 requires a state change as a result of request 700, then host system 102 transfer the request 700 to message handler 128A The process of converting a TCP/IP message from host system 102 to a signal that is readable by process equipment 106 is described in FIG. 6B. At step 602B, message handler 128B monitors activity for requests from host system 102. These requests may come from AMHS 104 and/or from MCS application 134. At step 604B, if a request 700 is detected for process equipment 106, message handler 128B removes the TCP/IP formatting from the request 700 at step 606B and transmits the remaining TFTP message 704 to conversion unit 126B at step 608B. Conversion unit 126B receives the TFTP message 704 and decodes the data, transforming it into a signal readable by passive equipment 106 at step 610B. Conversion unit 126B sets the appropriate signal line to the state requested in the message 704 from host system 102 at step 612B. Process equipment 106, which has been monitoring signal state changes (e.g., per standard implementation of E84), then responds in accordance with the signal state change via message 704.

As indicated above, the conversion system enables continuous communications between processing equipment and an automated material handling system. The conversion system is coupled to the process equipment and AMHS connectors and includes both a conversion unit that converts the parallel interface signals into an Ethernet LAN packaged communication as well as a message handler that interfaces between the AMHS/process equipment and the conversion units. By converting the parallel interface signals to a network-based communication, individual cables for each equipment load port are not required. Each piece of process equipment may then act as its own network hub, distributing signals to individual load ports as necessary.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A system for providing continuous communication between passive equipment and active equipment, comprising;
   a conversion unit coupled to at least one of said passive equipment and active equipment, said conversion unit operable for:
      monitoring signals received from at least one of said passive equipment and active equipment, said signals relating to at least one equipment state; and
      upon detecting a state change, converting a signal associated with said state change to a TCP/IP-formatted request; and
   a message handler coupled to said conversion unit, said message handler operable for:
      receiving said request from said conversion unit; and
      transmitting said request to a host system;
   wherein said message handler is further operable for removing TCP/IP formatting from said request resulting in a file transfer protocol message; and
   wherein said conversion unit is further operable for:
   converting said file transfer protocol message to a signal;
   responding to said signal by at least one of said passive equipment and said active equipment; and
   wherein said converting a signal associated with said state change includes:
   decoding said file transfer protocol message; and
   setting a signal line to a requested state.

2. The system of claim 1, further comprising a connector coupled to said at least one of a passive equipment and an active equipment, said connector in communication with said conversion unit; wherein said connector includes pins assignable for specifying a state change.

3. The system of claim 1, wherein said signals include directions for executing a carrier handshake operation.

4. The system of claim 3, wherein said signals conform to SEMI E84 specification.

5. The system of claim 1, further comprising a materials control application executing on said host system; wherein said transmitting a request to a host system includes transmitting said request to said materials control application, said materials control application associated with said active equipment.

6. The system of claim 1, wherein said TCP/IP-formatted request includes an Internet Protocol header operable for specifying an address of at least one load port associated with said at least one of a passive equipment and an active equipment.

7. The system of claim 1, further comprising a network; wherein said host system receives said request from said message handler via said network.

8. The system of claim 7 wherein said network is a local area network.

9. The system of claim 7, wherein said network is a wireless local area network.

10. A storage medium encoded with machine-readable computer program code for providing continuous communication between passive equipment and active equipment, said program code including instructions for causing a conversion system to implement a method, comprising:
   monitoring, via a conversion unit of the conversion system, signals received from at least one of said passive equipment and active equipment, said signals relating to at least one equipment state;
   upon detecting a state change, converting, via the conversion unit, a signal associated with said state change to a TCP/IP-formatted request;
   receiving, at a message handler coupled to said conversion unit, said request and transmitting said request to a host system;
   removing, via the message handler, TCP/IP formatting from said request resulting in a file transfer protocol message;
   converting, via the conversion unit, said file transfer protocol message to a signal; and
   responding, via the conversion unit, to said signal by at least one of said passive equipment and said active equipment;
   wherein said converting a signal associated with said state change includes:
   decoding said file transfer protocol message; and
   setting a signal line to a requested state.

* * * * *